United States Patent [19]
Chiang

[11] Patent Number: 5,483,478
[45] Date of Patent: Jan. 9, 1996

[54] METHOD AND STRUCTURE FOR REDUCING CARRY DELAY FOR A PROGRAMMABLE CARRY CHAIN

[75] Inventor: David Chiang, Saratoga, Calif.

[73] Assignee: Xilinx, Inc., San Jose, Calif.

[21] Appl. No.: 225,192

[22] Filed: Apr. 8, 1994

Related U.S. Application Data

[63] Continuation of Ser. No. 961,754, Oct. 16, 1992, abandoned.

[51] Int. Cl.$^6$ ........................................... G06F 7/50
[52] U.S. Cl. ................................. 364/787; 364/788
[58] Field of Search ........................ 364/787–788

[56] References Cited

U.S. PATENT DOCUMENTS

| | | | |
|---|---|---|---|
| 3,553,446 | 1/1971 | Kruy | 364/788 |
| 4,682,303 | 7/1987 | Uya | 364/788 |
| 4,707,800 | 11/1987 | Montrone et al. | 364/788 |
| 4,737,926 | 4/1988 | Vo et al. | 364/787 |
| 5,018,093 | 5/1991 | Shih | 364/788 X |
| 5,047,975 | 9/1991 | Patti et al. | 364/786 |
| 5,117,386 | 5/1992 | Persoon et al. | 364/787 |

OTHER PUBLICATIONS

Joseph J. F. Cavanagh, "Digital Computer Arithmetic Design and Implementation", McGraw–Hill Book Company, 1984, pp. 117–122.

Primary Examiner—Tan V. Mai
Attorney, Agent, or Firm—Jeanette S. Harms

[57] ABSTRACT

A carry-lookahead structure for programmable architectures includes a number of M-bit carry lookahead units, each M-bit unit having two parallel programmable carry paths having AND gates controlled by configuration bits to program the beginning and end of an operating carry chain within the M-bit units, as well as the beginning locations in each unit, one path generating a first set of carry bits for the case of the carry-in equal to 0, and the other generating a second set of carry bits for the case of the carry-in equal to 1, and at least one multiplexer controlled by the carry-in for selecting one of the two carries at the most significant bit of the first and second sets of carry bits as carry-out of the unit. Each M-bit unit may further include multiplexers controlled by the carry-in for selecting which of the first and second sets of carry bits are the correct carry bits for addition and M sum logic elements for generating the outputs of sum bits. An alternative is an adder in which the precomputation of the sums is performed for the two possible values of carry-in in each M-bit unit, providing two sets of sum bits, and where multiplexers select which of the two sets of the sum bits is the correct sum and which of the two carry bits produced in the most significant bit of the unit is used as the carry-out of the unit in response to the actual carry-in value of the unit.

18 Claims, 10 Drawing Sheets

LEAST                          MOST
                         SIGNIFICANT                    SIGNIFICANT
                            BIT                             BIT
                              ↘                              ↙
t = 0 ns →   a[ ]:  111111    111111    111111    101010
             b[ ]:  100000    000000    000000    011000

C[ ]':  XXXXXX    XXXXXX    XXXXXX    XXXXXX
             C[ ]":  XXXXXX    XXXXXX    XXXXXX    XXXXXX

S[ ]:   XXXXXX    XXXXXX    XXXXXX    XXXXXX t = 5 ns →   C[ ]':  01111X    00000X    00000X    00010X
             C[ ]":  11111X    11111X    11111X    11110X

S[ ]:   0000XX    XXXXXX    XXXXXX    XXXXXX t = 6 ns →   C[ ]':  011111    000000    000000    000100
             C[ ]":  111111    111111    111111    111100

S[ ]:   00000X    XXXXXX    XXXXXX    XXXXXX t = 9 ns →   S[ ]:   000000    000000    XXXXXX    XXXXXX t = 11 ns →  S[ ]:   000000    000000    000000    XXXXXX t = 13 ns →  S[ ]:   000000    000000    000000    001110

| a | b | c | d | e | f | CY | STATES OF TRANSISTORS | | |
|---|---|---|---|---|---|----|------|------|------|
| | | | | | | | TR1 | TR2 | TR3 |
| 0 | 0 | 0 | 0 | 1 | 1 | 0 | ● | ● | ○ |
| 0 | 0 | 1 | 0 | 1 | 1 | 0 | ● | ● | ○ |
| 0 | 1 | 0 | 1 | 1 | 0 | 0 | ○ | ● | ● |
| 0 | 1 | 1 | 1 | 1 | 0 | 1 | ○ | ● | ● |
| 1 | 0 | 0 | 1 | 1 | 0 | 0 | ○ | ● | ● |
| 1 | 0 | 1 | 1 | 1 | 0 | 1 | ○ | ● | ● |
| 1 | 1 | 0 | 0 | 0 | 0 | 1 | ● | ○ | ● |
| 1 | 1 | 1 | 0 | 0 | 0 | 1 | ● | ○ | ● |

● REPRESENTS CUTOFF OF A TRANSISTOR
○ REPRESENTS CONDUCTION OF A TRANSISTOR

METHOD AND STRUCTURE FOR REDUCING CARRY DELAY FOR A PROGRAMMABLE CARRY CHAIN

This application is a continuation of application Ser. No. 07/961,754, filed Oct. 16, 1992, now abandoned.

BACKGROUND OF THE INVENTION

1. Field of the Invention

This invention relates to programmable architectures, and more particularly to a method and structure for a fast programmable carry chain in programmable architectures, the beginning and end of which are user-programmable.

2. Description of the Prior Art

Figure 1A:
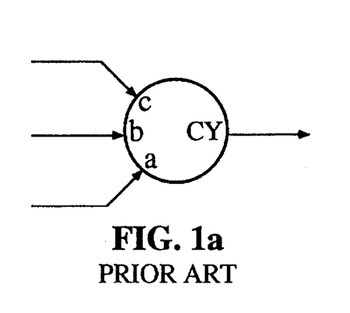
FIG. 1(a) shows the symbol for a carry logic element.
Figure 1B:
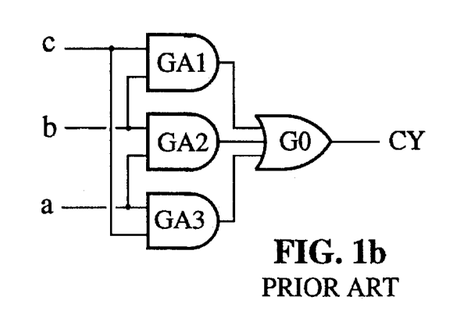
FIG. 1(b) is a logic presentation for a carry logic element.
Figure 2:
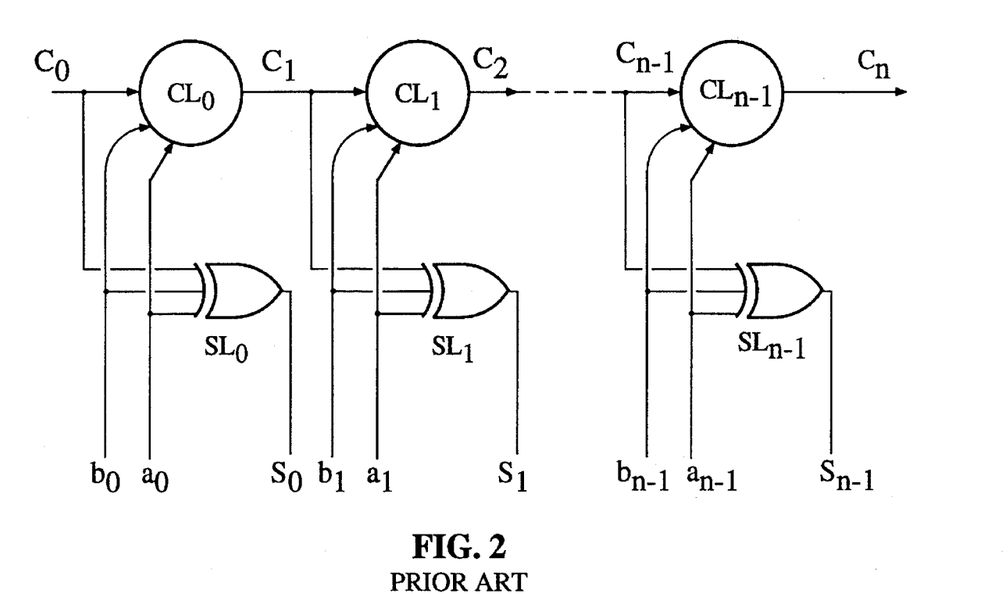
FIG. 2 shows a conventional n-bit adder wherein two n-bit addends and a carry-in value produce a sum and a carry-out value.

FIG. 2 depicts a conventional n-bit adder. The adder includes n-bit carry logic elements $CL_0$–$CL_{n-1}$ and n-bit sum logic elements (exclusive OR gates) $SL_0$–$SL_{n-1}$. Each carry logic element $CL_K$ (K=1, 2 ... N–1) receives two addend bits $a_K$, $b_K$ and a carry bit $C_K$ produced by a carry logic element of a less significant bit and generates a carry $C_{K+1}$ signal to a carry logic element of a more significant bit, as shown in FIG. 1(a). FIG. 1(b) is a logic presentation for a bit carry logic element as in FIG. 2 which consists of three AND gates GA1–GA3 and an OR gate GO. A sum operation for each bit can be executed by a 3-input exclusive OR (XOR) gate $SL_0$, $SL_1$, $SL_{n-1}$ as shown in FIG. 2. In such an adder circuit, carry bits are propagated by rippling bit by bit from the least significant to the most significant bit and hence the propagation delay $T_{PD}$ of the adder is approximately:

$$T_{PD} = (N-1)\, t_c + t_{XOR} \tag{1}$$

where $t_C$ is the propagation delay of a single carry bit, N is the total number of bits, and $t_{XOR}$ is the propagation delay of the 3-input XOR gate $SL_0$, $SL_1$, $SL_{n-1}$ used for summing in each stage.

Figure 3:
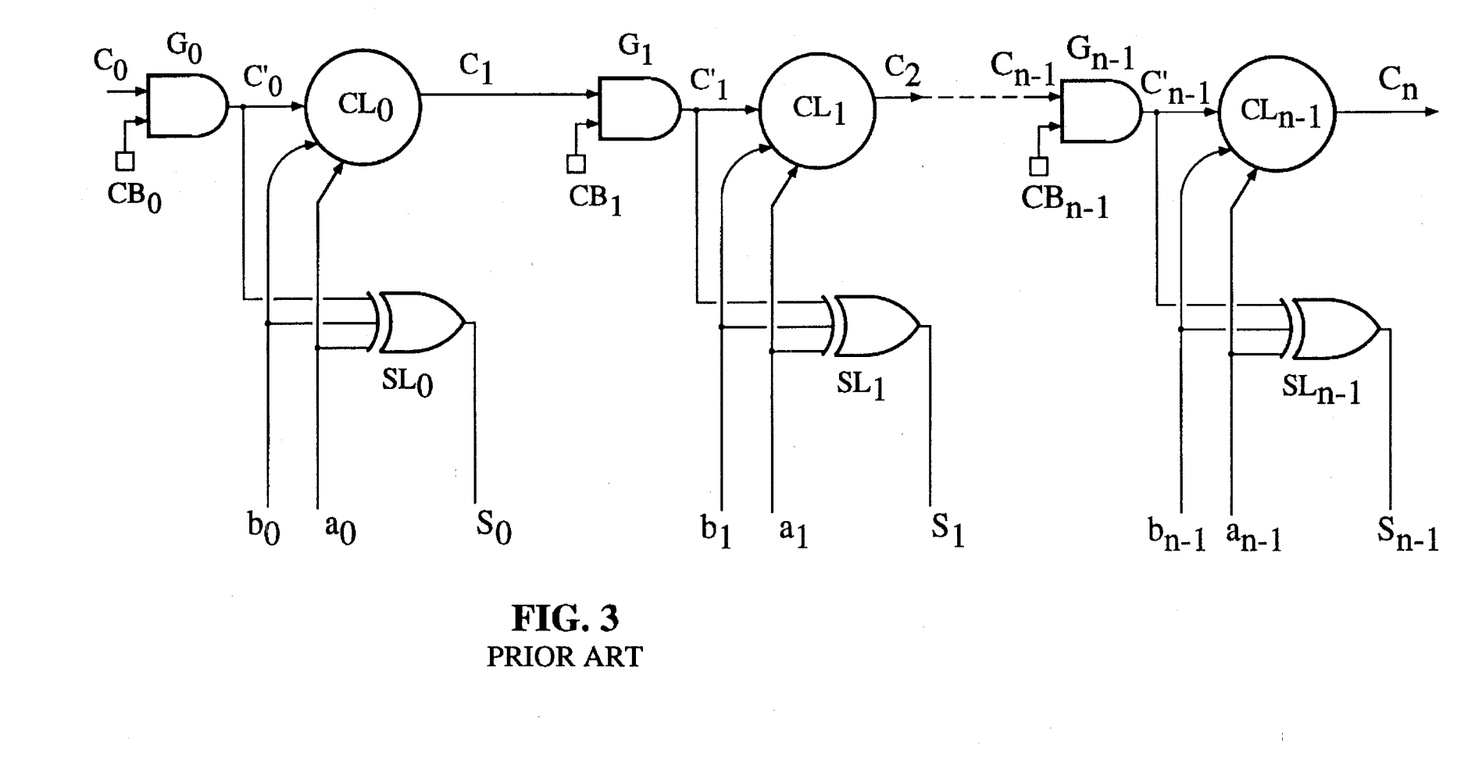
FIG. 3 shows a conventional programmable n-bit adder wherein configuration bits are used to program the beginning and end locations of the adder.

FIG. 3 shows a conventional, programmable n-bit adder circuit which is the same as the adder circuit shown in FIG. 2, except for the AND gates $G_0$–$G_{n-1}$. The beginning and end of a K-bit adder sequence (K≧N) can be programmed by enabling K consecutive carry propagation in the n-bit chain through configuration bits $CB_0$–$CB_{N-1}$ which may come from a conventional configuration control register using, for example, fuses, anti-fuses, EPROMs, EEPROMs or other programmable memory elements. The propagation delay of this programmable adder circuit is also expressed by expression (1), provided the delay of gates $G_0$–$G_{N-1}$ is included in the propagation delay of a single carry bit or a single stage of the carry chain. In present semiconductor fabrication technologies, $t_C$ and $t_{XOR}$ are on the order of 1 ns/bit, hence a 24 bit add requires about 24 ns.

High-speed binary adders are important functions in many integrated circuit logic applications, including many applications designed using programmable logic. The propagation speed of the arithmetic carry path is the key to high-speed operation. There are several standard carry-lookahead schemes such as carry selection and conditional sum, which can be used in a conventional adder as shown in FIG. 2 to reduce the carry propagation delay. For example, one of such known techniques, carry-select addition is described in Joseph J. F. Cavanagh, "Digital Computer Arithmetic Design and Implementation," McGraw-Hill Book Company, 1984, pp. 117–122, incorporated here by reference. The carry select adder requires two identical parallel adders that are partitioned into certain-bit groups with a group carry being produced. Two sums are generated simultaneously, one sum assumes that the carry-in to the group is 0, the other sum assumes that the carry-in to the group is 1. Subsequently, the actual group carry is used to select the correct sum from the two sums. However, such standard "carry-lookahead" speedup schemes cannot be used in a straight-forward manner to speed up the carry delay in a programmable architecture which has a programmable carry chain for producing either a sum or the most significant carry bit from two addends, and in which the beginning and end of the carry path are not known during the chip design and are user specified. So far, no prior art discloses carry-lookahead structures which are built into the chip architecture and compatible with the programmability of the carry path. Therefore, there is a need to incorporate the carry-lookahead technology into such programmable logic circuits, for example, an adder chain within a PLD, to speed up the carry delay. The difficulty is finding a carry-lookahead circuit that is compatible with the programmability of the carry path.

SUMMARY OF THE INVENTION

Accordingly, one object of this invention is to reduce carry delay for a programmable architecture having a programmable carry chain.

Another object of this invention is to incorporate the carry select scheme into a programmable architecture having a programmable carry chain.

A further object of this invention is to provide a carry-lookahead structure for a programmable carry chain in a programmable architecture.

The term "programmable carry chain" used here means a carry chain, the beginning and end of which are user-programmable.

In accordance with the present invention, a programmable carry chain built into a programmable chip architecture includes a plurality of multi-bit carry-lookahead units, each unit having a programmable carry chain including carry logic elements, a carry-in input for receiving a carry bit produced by a less significant unit, and a carry-out output for sending a carry bit to the next more significant unit as a carry-in input thereof. That is, such a structure is part of the chip when fabricated, before it is programmed, and hence is independent of user programmability. The carry inputs of the carry logic elements are controlled by combinatorial gates such as AND gates or OR gates, which are in turn controlled by the configuration bits to program the beginning and end of the carry chain in the plurality of units, as well as the beginning location in each unit. The precomputation is carried out in each unit for the two cases where the carry-in is 0 or 1, providing two sets of possible results. At least one multiplexer controlled by the carry-in of each unit selects the correct result.

It is to be understood that not all the carry lookahead units need be of the same length, i.e., only M-bits where M is a constant. It may be advantageous to size the units to be of different lengths to "fold in" multiplexer delays from less significant units.

In accordance with one aspect of the present invention, the precomputation of the carry path is carried out to provide two sets of possible carry bits, and multiplexers are used to select which set of the two sets of carry bits is used for generating the sum in response to the carry-in of the unit.

In accordance with another aspect of the invention, the precomputation of the sums is performed for the two possible values of carry-in, providing two sets of sum bits. Multiplexers are used to select which of the two sets of sum bits is the correct sum and which of the two carry bits produced in the carry logic of the most significant bit is used as the carry-out of the unit.

The above and other objects, features and advantages of the present invention will be clear from the following description of the preferred embodiments in conjunction with the accompanying drawings.

DETAILED DESCRIPTION

Figure 4:
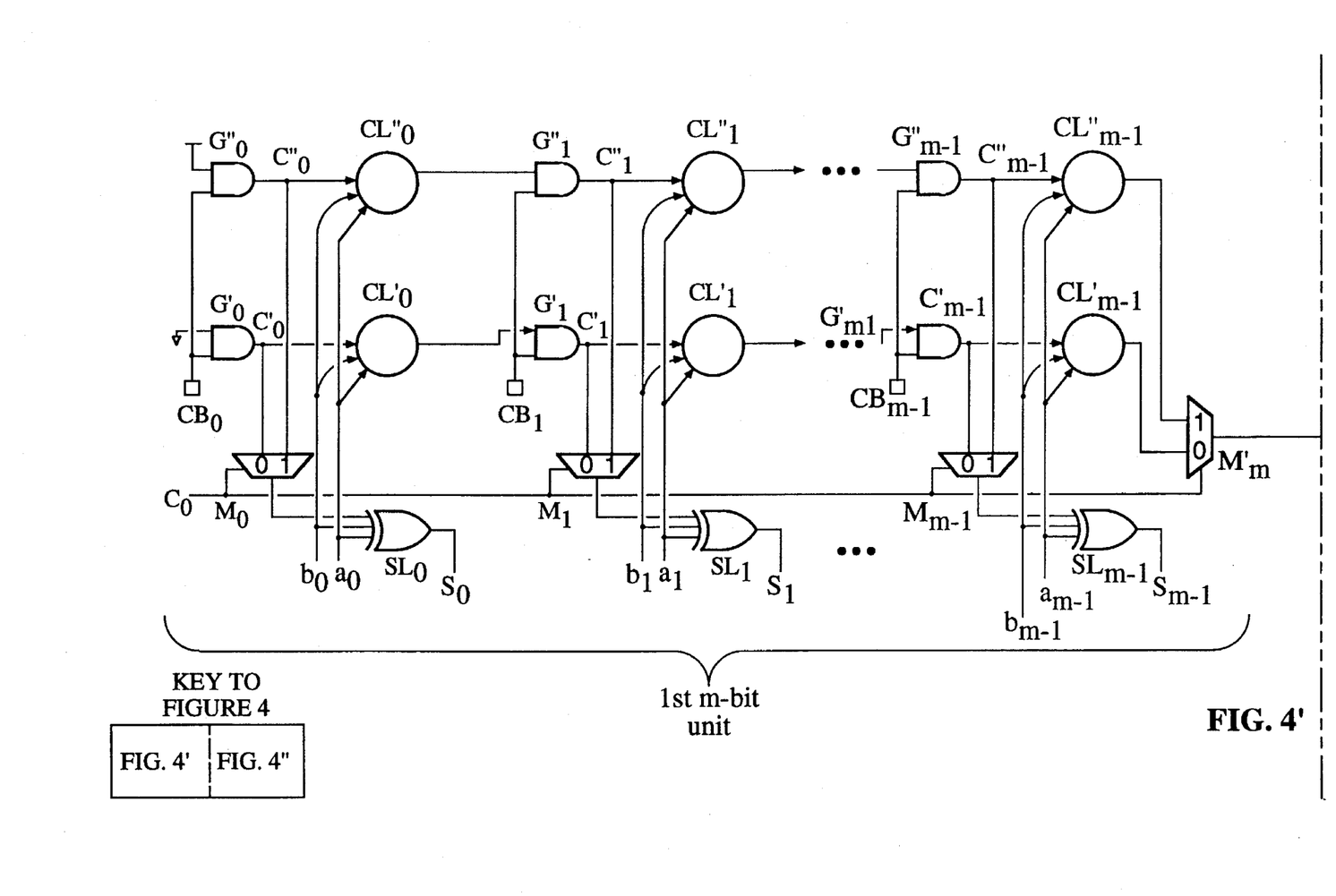
FIG. 4 shows a programmable fast n-bit adder according to one embodiment of the present invention.

Reference is now made to FIG. 4, showing a carry-lookahead structure for a programmable adder including a plurality of multi-bit units, for example, of M-bit units. (It is to be understood that the units need not be of uniform length, however). Each multi-bit unit (for example, the first M-bit unit) comprises a plurality of configuration bits ($CB_0$, $CB_1$, ... $CB_{m-1}$), a carry-in input line for receiving a carry bit ($C_0$) from a less significant multi-bit unit and a carry-out output line for sending a carry bit ($C_m$) to the next more significant unit (the second multi-bit unit), inputs of addends ($a_0$ ... $a_{m-1}$, $b_0$ ... $b_{m-1}$) and outputs of sums ($S_0$ ... $S_{m-1}$). Each multi-bit unit includes two independent carry chains (C' including $CL'_0$ ... $CL'_{m-1}$, and C" including $CL"_0$ ... $CL"_{m-1}$) to compute two sets of M carry bits ($C'_1$ ... $C'_m$, $C"_1$ ... $C"_m$) respectively, based on a presumed carry-in being 0 or 1. Chain C' computes M carry bits ($C'_1$ ... $C'_m$) with the presumed carry-in being 0 ($C_0=0$); and chain C" computes M carry bits ($C"_1$ ... $C"_m$) with the presumed carry-in being 1 ($C_0=1$). Hence one of these two chains; C' and C" contains the correct carry information. As shown in FIG. 4, the configuration bits ($CB_0$, $CB_1$, ... $CB_{m-1}$, $CB_m$ ...) control the carry logic elements in each of the two carry chains through AND gates $G'_0$, $G'_1$ ... and $G"_0$, $G'_1$, ... in the same manner, and programming of these configuration bits therefore determines the beginning and end of the consecutive multi-bit units forming the adder as well as the beginning location performing carry and sum operations in each unit. The actual incoming carry-in then controls a 2-to-1 multiplexer ($M_0$ ... $M_{m-1}$, $M'_m$) to select which of the two chains will be used in the add operation as well as the valid carry-out to the next more significant multi-bit unit. Assuming all multi-bit units have the same length M, and assuming the propagation delay for each single carry stage is $t_C$ and the addends $a_0$ ... $a_{m-1}$, $b_0$ ... $b_{m-1}$ are valid at t=0, the time when $C'_m$ and $C"_m$ (as well as $C'_{2m}$, $C"_{2m}$ ... $C"_{Km}$, $C"_{Km}$, wherein K is the quotient if N is evenly divisible by M, and is the integral portion of the quotient plus 1 if N is not evenly divisible by M) begin to appear will be $Mt_C$, and the carry-out value $C_m$ will appear at time $Mt_C+t_m$, where $t_m$ is the delay of a single multiplexer. The carry-out of the next more significant M-bit unit will then be generated at time $Mt_C+2t_m$, and so forth. The carry $C_{N-1}$ will be generated approximately at the time $Mt_C+(N/M-1)t_m$ and the Nth sum bit will appear approximately at time $Mt_C+(N/M-1)t_m+t_{XOR}$. The adder propagation delay time $T_{PD}$ for any N and M is therefore approximately:

$$T_{PD}=Mt_c+(N-M)t_m/M+t_{XOR} \qquad (2)$$

where $t_C$=propagation delay per carry bit within a unit;

$t_m$=propagation delay per multiplexer;

$t_{XOR}$=propagation delay of the 3-input XOR function (i.e., sum function);

M=number of bits per lookahead unit;

N=total number of bits in the carry chain.

For present integrated circuit fabrication technologies, $t_C$ and $t_{XOR}$ are about 1 ns and $t_m$ is about 2 ns. In the case of a 24-bit add operation with 6-bit units, the adder propagation delay is about 13 ns (6 ns+3×2 ns+1 ns) in comparison with 24 ns in the case of FIG. 3.

Figure 5:
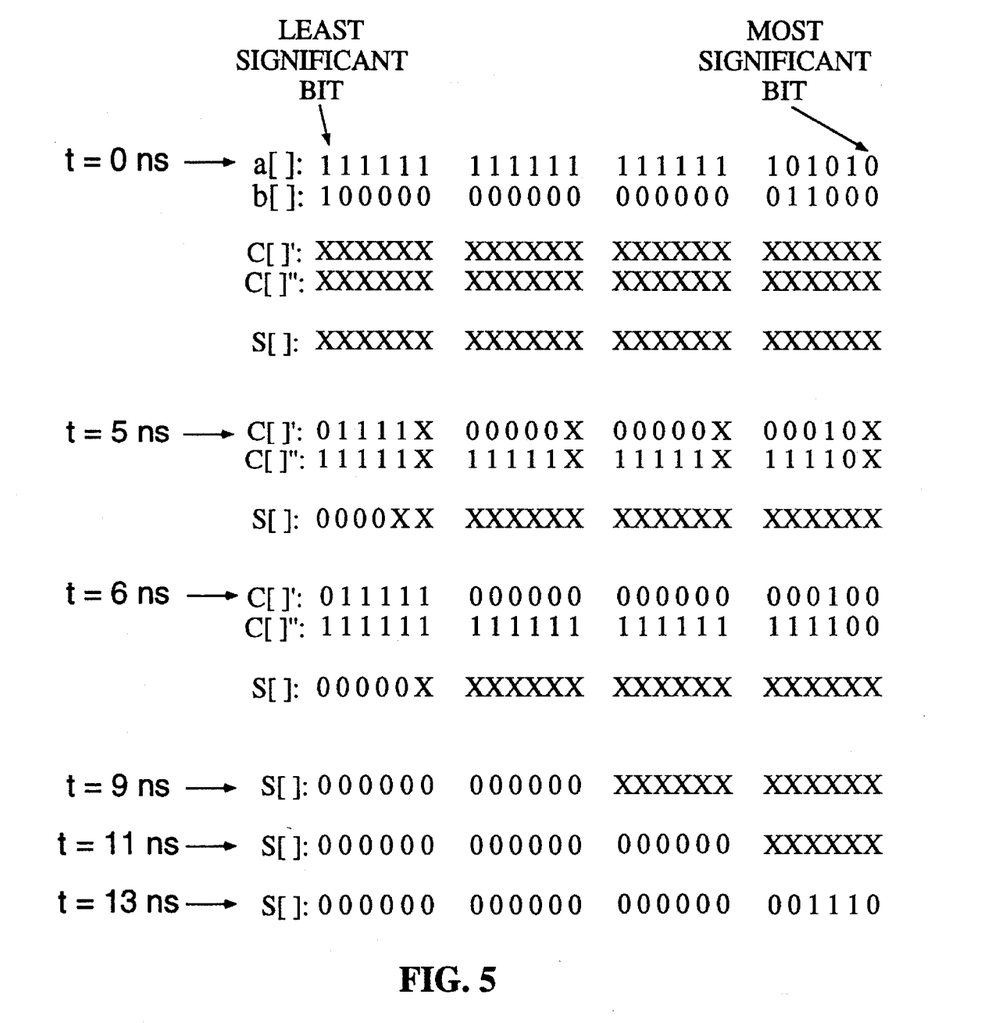
FIG. 5 shows an example of the fast adder operation.

Illustrated in FIG. 5 is an example of the fast adder operation for two 24-bit addends effected by the adder shown in FIG. 4.

The two addends a and b are shown in FIG. 5, and are validated at time t=0 ns. For illustration purposes, we assume that:

Carry delay $t_C$=1 ns/bit

Propagation delay per mux $t_m$=2 ns

The number of lookahead bits M=6 bits

Total number of bits N=24 bits

XOR delay=1 ns

At t=0 ns, no bits of C', C" and S are yet available because of propagation delay. At t=5 ns, the least five significant carries for each 6-bit unit are available, and the most significant carry for each unit is not yet available. Since passing through an XOR gate requires an extra 1 ns for producing the sum of the fifth bit, only the least four sum bits of the first 6-bit unit are available at this time, as shown in FIG. 5. Sum bits in other units are not yet available, because their carry-in input is not available. At t=6 ns, both sets of carry bits in every unit become available and the least five significant sum bits appear. Again for the same reason, sum bits in other units are not available. The carry-in of the second 6-bit unit appears at t= 8 ns and the sum bits in the second unit become available at t=9 ns after the propagation delay of an XOR gate. Subsequently, the sum bits in the third and fourth units will become available at t=11 ns and t=13 ns respectively. The sum therefore becomes valid after 13 ns delay from the validity of the two addends, which is much faster than in the conventional adder.

Note that in FIG. 5, the M-units may be of lengths 6, 8, 10, or 12, in which case at t=13 ns, there will be 36 bits of valid sum rather than 24 bits.

Figure 6:
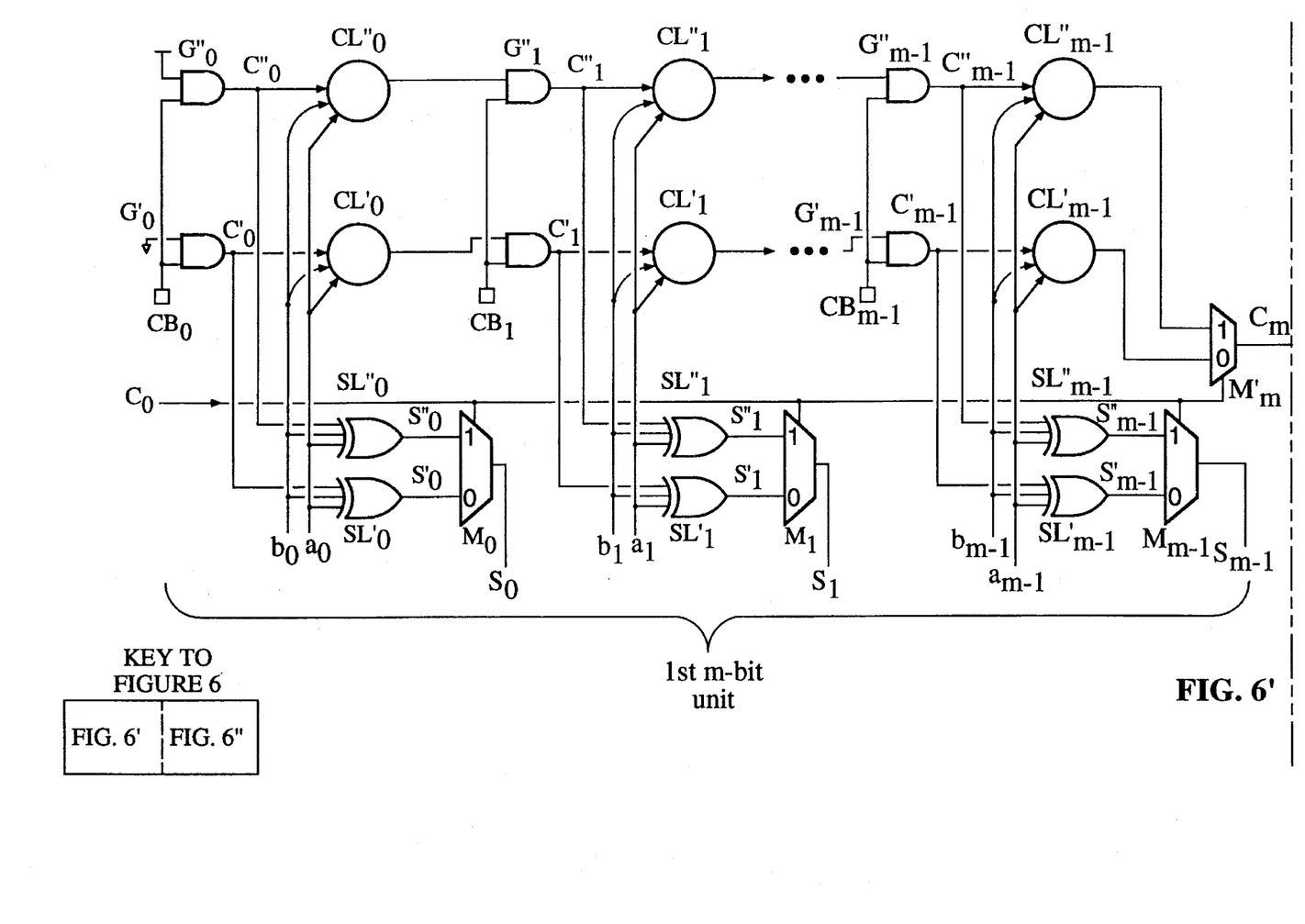
FIG. 6 shows a programmable fast n-bit adder according to another embodiment of the present invention.

FIG. 6 shows another embodiment of the present invention, in which two parallel sum elements (S' including $SL'_0$ ... $SL'_{m-1}$, $SL'_m$ ... $SL'_{m-1}$ ... $SL'_{n-1}$, and S" including $SL"_0$ ... $SL"_{m-1}$, $SL"_m$ ... $SL"_{2m-1}$ ... $SL"_{n-1}$) for each bit is provided, and the precomputation of the sum bits is further performed in each unit providing two sets of possible sums $S'_0 \ldots S'_{n-1}$, and $S''_0 \ldots S''_{n-1}$. Multiplexers ($M_0 \ldots M_{m-1}$, $M'_m, M_n \ldots M_{2m-1}, M'_{2m}, M_{2m} \ldots M_n$) are used to select which of the two sets of the sums is the correct sum in response to the actual carry-in ($C_0, \ldots C_m$) of each unit as well as to select which of two carries produced in the most significant bit of every M-bit unit is the carry-out of the unit. The adder propagation delay in this embodiment is approximately:

$$T_{PD} = M\, t_c + Nt_m/M \qquad (3)$$

$t_c$, $t_m$, M and N are defined as above. In the case of a 24-bit add operation with 6-bit units, the adder propagation delay is about 14 ns, (6 ns+4×2 ns) for the same assumed $t_C$, $t_m$ values as above, which is much faster in comparison with 24 ns in the case of FIG. 3.

Sometimes, the sum logic elements $SL_0, SL_1, \ldots SL_{m-1}$, $SL_m, \ldots$ and multiplexers $M_0, M_1, \ldots M_{m-1}, M_m, \ldots$ in FIG. 4 are not used because there are cases where a carry chain is needed without the sum operation. For example, a comparator circuit with output either "A≧B" or "A>B" may be implemented by a subtractor, which may be considered as a special adder in binary logic. The output A≦B for a comparator corresponds to a "0" carry-out for the function "B−A", and the A>B corresponds to a "1" carry-out for the same substraction function.

Figure 7:
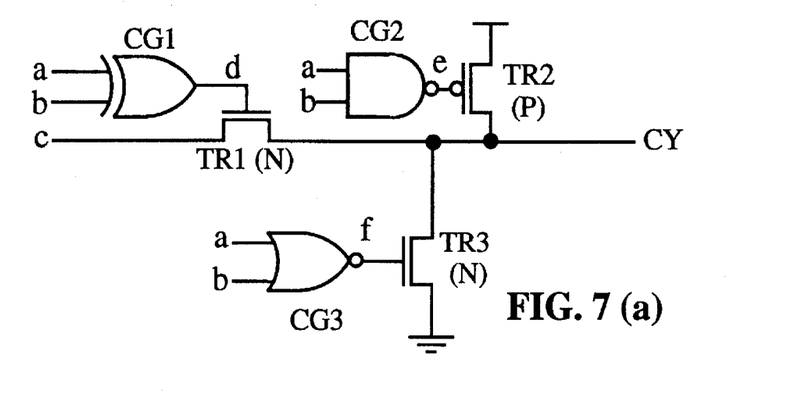
FIG. 7(a) shows a circuit diagram for effecting a bit carry function.
FIG. 7(b) is a truth table of the logic variables, including the states of the transistors.
FIG. 7(c) shows a circuit diagram forming one stage of two parallel M-bit carry paths of each M-bit unit, which has a shared portion of logic elements for the two paths.
FIG. 7(d) is the logic symbol for a single stage logic circuit of the two parallel carry paths used in FIGS. 4 or 6.
Figure 7D:
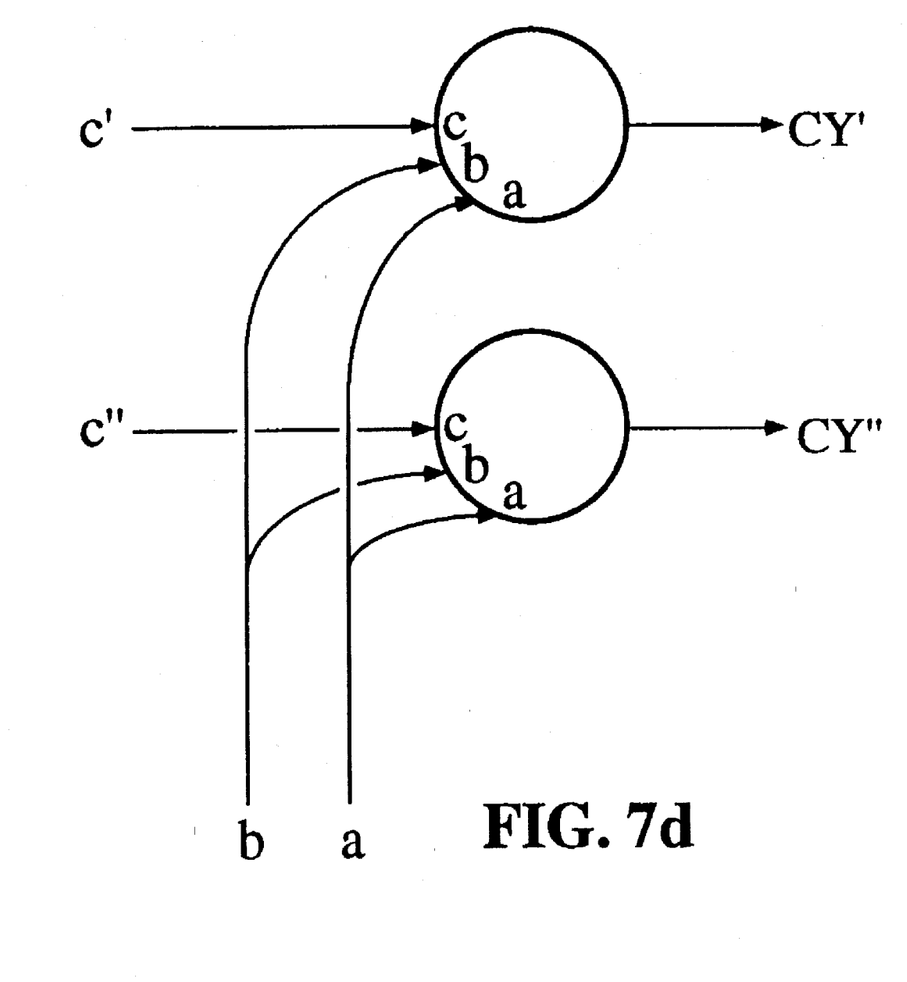

Although there are two parallel carry paths in each M-bit unit either in FIGS. 4 or 6, in an actual design, the two carry paths may share a portion of the logic elements if the carry path is properly designed. For example, if the circuit shown in FIG. 7(a) is used as a carry logic circuit for each bit to implement the same logic function of the symbol of FIG. 1(a), the circuit shown in FIG. 7(c), which may be used in each multi-bit unit shown in FIGS. 4 or 6 as the main part of a single stage of the two parallel carry paths, is then equivalent to the logic symbol shown in FIG. 7(d) performing the same function. As can be seen from FIG. 7(c), quite a few logic elements as shown in the dot-lined block in FIG. 7(c) may be shared by the two carry paths. The circuit shown in FIG. 7(a) comprises an XOR gate CG1, a NAND gate CG2, a NOR gate CG3, a PMOS transistor TR2 and two NMOS transistors TR1, TR3. The circuit generates a carry signal CY according to two addend bits a, b, and a carry input signal C from a less significant bit of the carry path. Signals d, e, f represent the outputs of the gates CG1, CG2 and CG3 respectively. The value of CY, as seen from FIG. 7(a) depends on the value of C and the states of the three transistors, which in turn depends on their gate control signal, i.e., the outputs of the three gates CG1–CG3 respectively.

FIG. 7(b) is a truth table of the logic variables shown in FIG. 7(a), including the states of the three transistors. Transistors TR1 and TR3 are N type MOS transistors and conduct when their gate control signals d, f are high (1) and cut off when the gate signals d, f are low (0), whereas transistor TR2 is a P type MOS transistor which conducts when its gate signal e is low (0), and cuts off when the signal is high (1). In the case where TR1 is cut off, which happens when the output d of the gate CG1 is 0, CY depends on the state of TR2 and TR3. When TR2 conducts and TR3 cuts off as happened in the last two lines of the table of FIG. 7(b), obviously, CY is high (1). When TR3 conducts and TR2 cuts off as happened in the first two lines of the table, CY is low (0). In the case when TR1 conducts, which happens when the output d of the gate CG1 is 1 and when both TR2 and TR3 cut off, as happened in the middle four lines of the table, CY obviously takes the same value as C.

This precomputation concept disclosed here can be recursive if desired. For example, each of the two carry paths within an M-bit unit can incorporate its own internal lookahead to further reduce carry delay.

Although the present invention has been described and illustrated in detail, it is clearly understood that the description is by way of illustration and example only and is not to be taken by way of limitation, the spirit and scope of the present invention being limited only by the terms of the appended claims.

What is claimed is:

1. A method for reducing carry delay for a programmable architecture including a programmable carry chain controlled by a plurality of configuration bits for specifying the beginning and end locations of said carry chain, said method comprising the steps of:

providing a plurality of multi-bit units, each multi-bit unit having a carry-in input line for receiving a carry bit from a less significant multi-bit unit, and a carry-out output line for sending a carry bit to a more significant multi-bit unit as a carry-in thereof;

including a plurality of subunits in each multi-bit unit, for each subunit;

coupling a first combinatorial gate to a first carry logic element via a first programmable carry path;

coupling a second combinatorial gate to a second carry logic element via a second programmable carry path;

providing a pair of addends to a sum logic element, said first carry logic element, and said second carry logic element;

multiplexing signals on said first programmable carry path and said second programmable path with a first multiplexer;

providing an output signal of said first multiplexer to said sum logic element;

coupling a means for configuring to the input terminal of said first combinatorial gate and to the input terminal of said second combinatorial gate;

coupling the first combinatorial gate of the first subunit of said multi-bit unit to a first voltage source and coupling the second combinatorial gate of said first subunit of said multi-bit unit to a second voltage source;

coupling the first combinatorial gate of a subsequent subunit of said multi-bit unit to the first carry logic element in a preceding subunit;

coupling the second combinatorial gate of said subsequent subunit of said multi-bit unit to the second carry logic element of said preceding subunit;

coupling the first carry logic element and the second logic element of a last subunit in said multi-bit unit to the input terminals of a second multiplexer;

activating said first and second multiplexers with a signal provided by said carry-in input line; and providing a signal from said second multiplexer to said carry-out output line.

2. A method as in claim 1, wherein the number of the carry logic elements in each more significant unit is greater than the number in the next, less significant unit thereof, provided that the delay caused by such extra carry logic elements in said each more significant unit is equal to or less than the delay of the multiplexer in the next, less significant unit.

3. A carry-lookahead structure for programmable architecture having a programmable carry chain comprising:

a plurality of multi-bit units, each multi-bit unit having a carry-in input line for receiving a carry bit from a less significant multi-bit unit, and a carry-out output line for sending a carry bit to a more significant multi-bit unit as a carry-in thereof;

each multi-bit unit further including a plurality of subunits, each subunit comprising:
- a first programmable carry path coupling a first combinatorial gate to a first carry logic element;
- a second programmable carry path coupling a second combinatorial gate to a second carry logic element;
- a sum logic element, wherein a pair of addends are provided to said sum logic element, said first carry logic element, and said second carry logic element;
- a first multiplexer, wherein said first programmable carry path and said second programmable math are coupled to the input terminals of said first multiplexer, wherein an output signal of said first multiplexer is provided to said sum logic element; and
- means for configuring coupled to the input terminal of said first combinatorial gate and the input terminal of said second combinatorial gate, wherein the first combinatorial gate of a first subunit of said multi-bit unit is coupled to a first voltage source and the second combinatorial gate of said first subunit of said multi-bit unit is coupled to a second voltage source, wherein the first combinatorial gate of a subsequent subunit of said multi-bit unit is coupled to the first carry logic element in a preceding subunit, wherein the second combinatorial gate of said subsequent subunit of said multi-bit unit is coupled to the second carry logic element of said preceding subunit, wherein the first carry logic element and the second carry logic element of a last subunit in said multi-bit unit are coupled to input terminals of a second multiplexer, wherein a signal on said carry-in input line activates said first multiplexer and said second multiplexer, and wherein said second multiplexer provides a signal to said carry-out output line.

4. A carry-lookahead structure as in claim 3 wherein said first voltage source is Vcc and said second voltage source is ground.

5. A carry-lookahead structure as in claim 4 wherein said first and second combinatorial gates include AND gates.

6. A carry-lookahead structure as in claim 3, wherein the number of carry logic elements in each more significant unit is greater than the number in the next, less significant unit thereof, provided that the delay caused by such extra carry logic elements in said each more significant unit is equal to or less than the delay of the multiplexer in the next, less significant unit.

7. A carry-lookahead structure as in claim 3, wherein each of said sum logic elements is a 3-input exclusive OR gate.

8. A carry-lookahead structure as in claim 3, wherein each carry bit comprises a portion of shared logic elements and a portion of independent logic elements.

9. A carry-lookahead structure as in claim 8, wherein said shared portion of logic elements comprises an exclusive OR gate, a NAND gate and a NOR gate, each gate having two input terminals for receiving said pair of addends.

10. A method for reducing carry delay for a programmable architecture including a programmable carry chain controlled by a plurality of configuration bits for specifying the beginning and end locations of said carry chain, said method comprising the steps of:

providing a plurality of multi-bit units, each multi-bit unit having a carry-in input line for receiving a carry bit from a less significant multi-bit unit, and a carry-out output line for sending a carry bit to a more significant multi-bit unit as a carry-in thereof;

including a plurality of subunits in each multi-bit unit, for each subunit;

coupling a first combinatorial gate to a first carry logic element via a first programmable carry path;

coupling a second combinatorial gate to a second carry logic element via a second programmable carry path;

providing a first sum logic element and a second sum logic element;

providing a pair of addends to said first and second sum logic elements, said first carry logic element, and said second carry logic element;

providing signals on said first programmable carry path and said second programmable path to said first sum logic element and said second logic element, respectively;

multiplexing the output signals from said first and second sum logic elements with a first multiplexer;

coupling a means for configuring to an input terminal of said first combinatorial gate and an input terminal of said second combinatorial gate;

coupling a first voltage source to another input terminal of the first combinatorial gate of the first subunit of said multi-bit unit and coupling a second voltage source to another input terminal of the second combinatorial gate of said first subunit of said multi-bit unit;

coupling the first combinatorial gate of a subsequent subunit of said multi-bit unit to the first carry logic element in a preceding subunit;

coupling the second combinatorial gate of said subsequent subunit of said multi-bit unit to the second carry logic element of said preceding subunit;

multiplexing signals from the first carry logic element and the second carry logic element of a last subunit in said multi-bit unit with a second multiplexer;

activating said first multiplexer and said second multiplexer with a signal provided by said carry-in input line;

providing a signal from said second multiplexer to said carry-out output line.

11. A method as in claim 10, wherein the number of the carry logic elements in each more significant unit is greater than the number in the next, less significant unit thereof, provided that the delay caused by such extra carry logic elements in said each more significant unit is equal to or less than the delay of the multiplexer in the next, less significant unit.

12. A carry-lookahead structure for programmable architecture having a programmable carry chain comprising:

a plurality of multi-bit units, each multi-bit unit having a carry-in input line for receiving a carry bit from a less significant multi-bit unit, and a carry-out output line for sending a carry bit to a more significant multi-bit unit as a carry-in thereof;

each multi-bit unit further including a plurality of subunits, each subunit comprising:
- a first programmable carry path coupling a first combinatorial gate to a first carry logic element;
- a second programmable carry path coupling a second combinatorial gate to a second carry logic element;
- a sum logic element, wherein a pair of addends are provided to said sum logic element, said first carry logic element, and said second carry logic element;

a first multiplexer coupled to said first programmable carry path and said second programmable path, wherein an output signal of said first multiplexer is provided to said sum logic element; and means for configuring coupled to an input terminal of said first combinatorial gate and an input terminal of said second combinatorial gate, wherein the first combinatorial gate of a first subunit of said multi-bit unit is coupled to a first voltage source and the second combinatorial gate of said first subunit of said multi-bit unit is coupled to a second voltage source, wherein the first combinatorial gate of a subsequent subunit of said multi-bit unit is coupled to the first carry logic element in a preceding subunit, wherein the second combinatorial gate of said subsequent subunit of said multi-bit unit is coupled to the second carry logic element of said preceding subunit, wherein the first carry logic element and the second carry logic element of a last subunit in said multi-bit unit are coupled to a second multiplexer, wherein a signal on said carry-in input line activates said first multiplexer and said second multiplexer, and wherein said second multiplexer provides a signal to said carry-out output line.

13. A carry-lookahead structure as in claim 12 wherein said first voltage source is Vcc and said second voltage source is ground.

14. A carry-lookahead structure as in claim 13 wherein said first and second combinatorial gates include AND gates.

15. A carry-lookahead structure as in claim 12, wherein the number of the carry logic elements in each more significant unit is greater than the number in the next, less significant unit thereof, provided that the delay caused by such extra carry logic elements in said each more significant unit is equal to or less than the delay of the multiplexer in the next, less significant unit.

16. A carry-lookahead structure as in claim 12 wherein said first and second sum logic elements include an exclusive OR gate.

17. A carry-lookahead structure as in claim 12, wherein each carry bit comprises a portion of shared logic elements and a portion of independent logic elements.

18. A carry-lookahead structure as in claim 12, wherein the shared portion of logic elements comprises an exclusive OR gate, a NAND gate and a NOR gate, each gate having two input terminals for receiving said pair of addends.

* * * * *

UNITED STATES PATENT AND TRADEMARK OFFICE
CERTIFICATE OF CORRECTION

PATENT NO. : 5,483,478
DATED : January 9, 1996
INVENTOR(S) : David Chiang

It is certified that error appears in the above-indentified patent and that said Letters Patent is hereby corrected as shown below:

Col. 1, line 42, delete "$(K \geq N)$" and insert -- $(K \leq N)$ --.

Col. 4, line 4, delete the first occurrence of "$C''_{Km}$" and insert -- $C'_{Km}$ --.

Col. 4, line 9, delete ":".

Col. 5, line 22, delete "$A \geq B$" and insert -- $A \leq B$ --.

Col. 7, line 13, delete "math" and insert -- path --.

Signed and Sealed this

Eighth Day of April, 1997

Attest:

BRUCE LEHMAN

Attesting Officer

Commissioner of Patents and Trademarks